United States Patent [19]

Matsuura

[11] Patent Number: 4,962,460
[45] Date of Patent: Oct. 9, 1990

[54] DIGITIZING APPARATUS FOR DIGITIZING A MODEL SURFACE USING A CONTACTLESS PROBE

[75] Inventor: Hitoshi Matsuura, Hachioji, Japan

[73] Assignee: Fanuc Ltd., Minamitsuru, Japan

[21] Appl. No.: 309,800

[22] PCT Filed: Jul. 28, 1988

[86] PCT No.: PCT/JP88/00762
§ 371 Date: Feb. 8, 1989
§ 102(e) Date: Feb. 8, 1989

[87] PCT Pub. No.: WO89/00906
PCT Pub. Date: Feb. 9, 1989

[30] Foreign Application Priority Data

Jul. 31, 1987 [JP] Japan .................................. 62-192296

[51] Int. Cl.$^5$ ............................................. G06F 15/46
[52] U.S. Cl. ................................. 364/474.03; 318/578
[58] Field of Search ................. 364/474.03, 474.28, 364/474.3; 318/576, 577, 578; 250/202; 356/376; 219/124.34

[56] References Cited

U.S. PATENT DOCUMENTS

| | | | |
|---|---|---|---|
| 4,424,570 | 1/1984 | Imazeki et al. | 364/474.03 X |
| 4,603,285 | 7/1986 | Matsuura et al. | 364/474.03 X |
| 4,654,570 | 3/1987 | Yamazaki | 364/474.03 X |
| 4,672,190 | 6/1987 | Rostkowski et al. | 364/474.03 X |

Primary Examiner—Joseph Ruggiero
Attorney, Agent, or Firm—Staas & Halsey

[57] ABSTRACT

A digitizing apparatus in which the surface of a model is traced by a probe which measures distance without contacting the surface, thereby forming digitizing data along the profiling path. First, drive motors for two axes are controlled simultaneously to form profiling data regarding the sectional shape of a model sectioned by a profiling plane formed by the two axes. Thereafter, the probe is moved along a second profiling direction which perpendicularly intersects a profiling direction defining an initial profiling path. Tangential vectors in the two profiling directions are obtained. Two perpendicular vectors are then decided from these tangential vectors. As a result, a normal vector at a point of intersection between the two profiling directions is computed.

4 Claims, 3 Drawing Sheets

DIGITIZING APPARATUS FOR DIGITIZING A MODEL SURFACE USING A CONTACTLESS PROBE

BACKGROUND OF THE INVENTION (1) Field of the Invention

This invention relates to a digitizing apparatus in which the surface of a model is traced by a probe which measures distance contactlessly, thereby forming digitizing data along the profiling path.

(2) Description of the Related Art

In ordinary tracer control, a stylus is moved while in contact with the surface of a model. Displacement quantities $\epsilon x$, $\epsilon y$, $\epsilon z$ along respective axes, which depend upon the tracing path on the model surface, are detected from a tracer head. In a tracer control apparatus, the displacement quantities $\epsilon x$, $\epsilon y$, $\epsilon z$ along the respective axes are combined into a vector and the direction of a normal to the model surface is computed to form profiling data. When machining is subsequently performed based on the digitizing data, offset values conforming to the axial components of the normal vector are decided and a difference between stylus diameter and cutter diameter is corrected by a three-dimensional correction.

In digitizing based on this conventional contact profiling system, the direction of displacement does not accurately reflect the normal line direction of the model surface due to friction between the stylus and model. It is difficult to form accurate digitizing data because of disturbance caused by roughness of the model surface. In addition, due to the inaccurate normal vector, the original model shape cannot be reproduced at the time of machining even if cutter diameter is compensated for in three dimensions.

SUMMARY OF THE INVENTION

The present invention has been devised in order to solve the foregoing problems. Its object is to provide a digitizing apparatus in which the digitizing of a model surface is performed twice using a contactless probe. The direction of the normal is accurately decided to enable a highly precise three-dimensional correction.

According to the present invention, there is provided a digitizing apparatus in which the surface of a model is traced by a probe which measures distance contactlessly, thereby forming digitizing data along the profiling path. The digitizing apparatus comprises direction setting means for setting a first profiling direction which defines the profiling path, and a second profiling direction which perpendicularly intersects the first profiling direction, memory means for storing tangent vectors computed from an error quantity between probe measurement distance and a reference distance in each of the profiling directions, arithmetic means for computing, from a vertical vector computed on the basis of the tangent vectors, a normal vector with regard to the surface of the model at a point of intersection between the two profiling directions, and correcting means for correcting, on the basis of the normal vector, digitizing data formed with regard to the first profiling direction.

The digitizing apparatus of the invention is such that the surface of a model M is digitized twice. That is, it is digitized along a first profiling path and along a second profiling path, using a contactless probe as shown in FIG. 4 so that the direction of the normal to the digitized model can be accurately corrected. Digitizing data can be formed which includes highly precise three-dimensional correction direction data.

DESCRIPTION OF THE PREFERRED EMBODIMENT

An embodiment of the present invention will now be described in detail with reference to the drawings.

Figure 2:
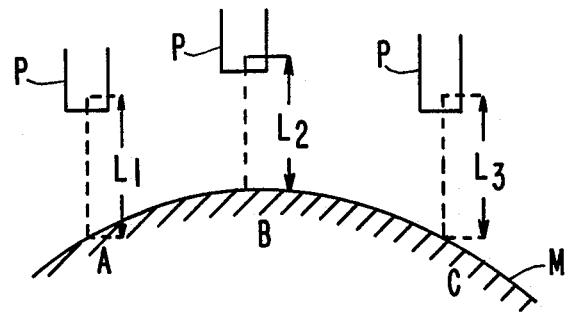
FIG. 2 is a diagram for describing contactless profiling.

First, contactless profiling will be described with reference to FIG. 2. This is a method in which profiling data is formed, without making contact with the surface of a model. A probe sensor, such as a laser probe, measures distance contactlessly. The probe sensor generally is set to a reference distance and outputs the difference between this distance and an actually measured distance as an error quantity. More specifically, points A, B and C on the surface of a model M are taken as suitably selected sampling points. In order to form profiling data for this surface, first a vertical distance $L_1$ from point A to a probe P is measured. Then the probe P is moved to the next sampling point B while applying a correcting operation which is commensurate with an error quantity $\Delta L_1 (=L_1-L_o)$ between the measured distance and a reference distance $L_o$ along the direction of the measurement axis. Next a vertical distance $L_2$ at point B is measured to compute an error quantity $\Delta L_2$ in the same manner. Then the probe is moved to point C while correcting the error quantity. In this way positional coordinates of the three sampling points within three-dimensional space are decided so that profiling data along the profiling path can be digitally sampled.

Figure 3:
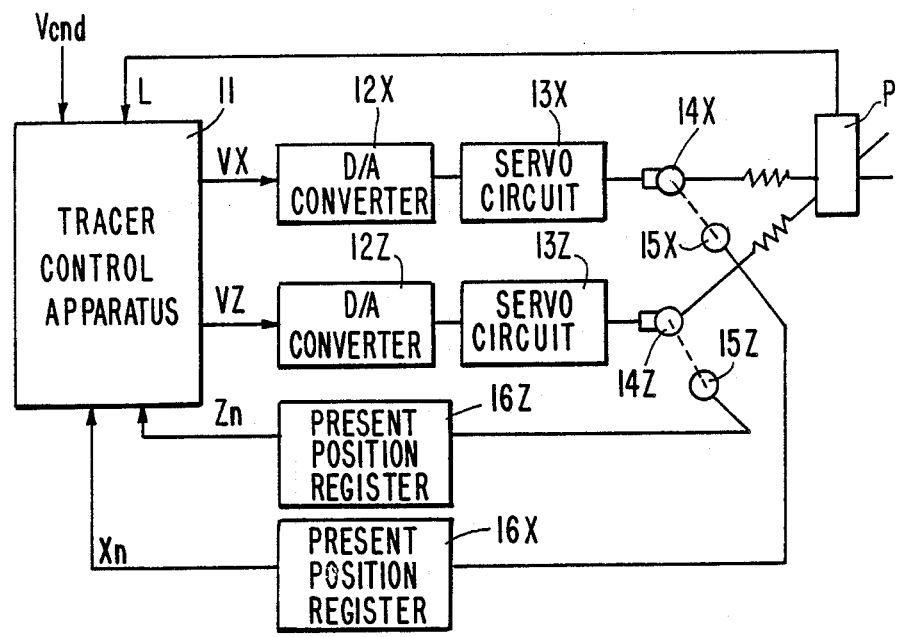
FIG. 3 is a block diagram of a digitizing apparatus which controls a probe.

FIG. 3 is a block diagram of an example of a digitizing apparatus for controlling the probe P which performs the above-described contactless profiling.

Numeral 11 denotes a tracer control apparatus, 12Z and 12X represent DA converters for DA-converting digital velocity signals Vx and Vz along the respective axes generated by the tracer control apparatus 11, 13Z and 13X designate servo circuits for the respective axes. Numerals 14Z and 14X denote motors to be driven along the Z and X axes, respectively, 15Z and 15X represent position detecting pulse coders for generating respective pulses Pz and Px each time the corresponding motors rotate through a predetermined angle, 16Z and 16X denote present position registers for the respective axes for monitoring present position (Xn,Zn) along the axes by reverse counting, in dependence upon the direction of movement, the pulses generated by the corresponding pulse coders.

The tracer control apparatus 11 receives, as inputs, the necessary data regarding commanded velocity Vcmd, profiling limits and profiling method, etc., from a control panel (not shown), as well as a measured distance L from the probe P. When these inputs arrive, the tracer control apparatus 11 computes the error quantity $\Delta L$ between the measured distance and the reference distance $L_o$ and computes, from the error quantity $_\Delta L$, the velocity of the probe P in the normal direction as well as the velocity thereof in a tangential direction. Also input to the tracer control apparatus 11 are the present axial positions (Xn,Zn) synchronized to the computation period. The apparatus 11 computes the angle of inclination of the model M and, based on this angle of inclination and the velocities in the normal and tangential directions, outputs the axial velocity signals Vx and Vz to the DA converters 12X and 12Z as profiling data. The movement of the probe P is controlled at the commanded profiling velocity Vcmd while the probe is held the reference distance $L_o$ above the surface of the model M.

Figure 4:
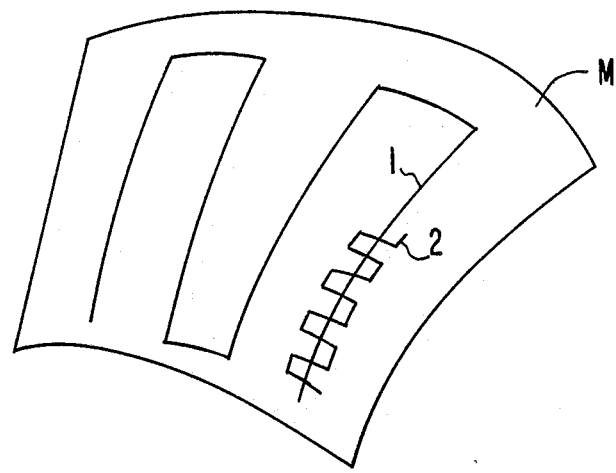
FIG. 4 is a diagram of two profiling paths for digitizing a model surface.

The profiling data (Vx,Vz) output by the above-described digitizing apparatus is obtained by continuously picking up points on the profiling path of the surface of model M. A correction corresponding to the diameter of the cutter must be performed in order to perform actual machining based on the digitizing data. Though the cutter diameter correction is performed in three dimensions in the direction of the normal to the surface of model M, it is necessary, in order to perform the cutter diameter correction correctly, to calculate the direction of the normal to the model surface at each point on the profiling path by some method and decide the direction of the three-dimensional correction. Therefore, according to the present invention, the direction of the normal is correctly decided by performing digitizing on the surface of the model M twice. That is, digitizing is performed along a first profiling path 1 and a second profiling path 2, as shown in FIG. 4.

Figure 1:
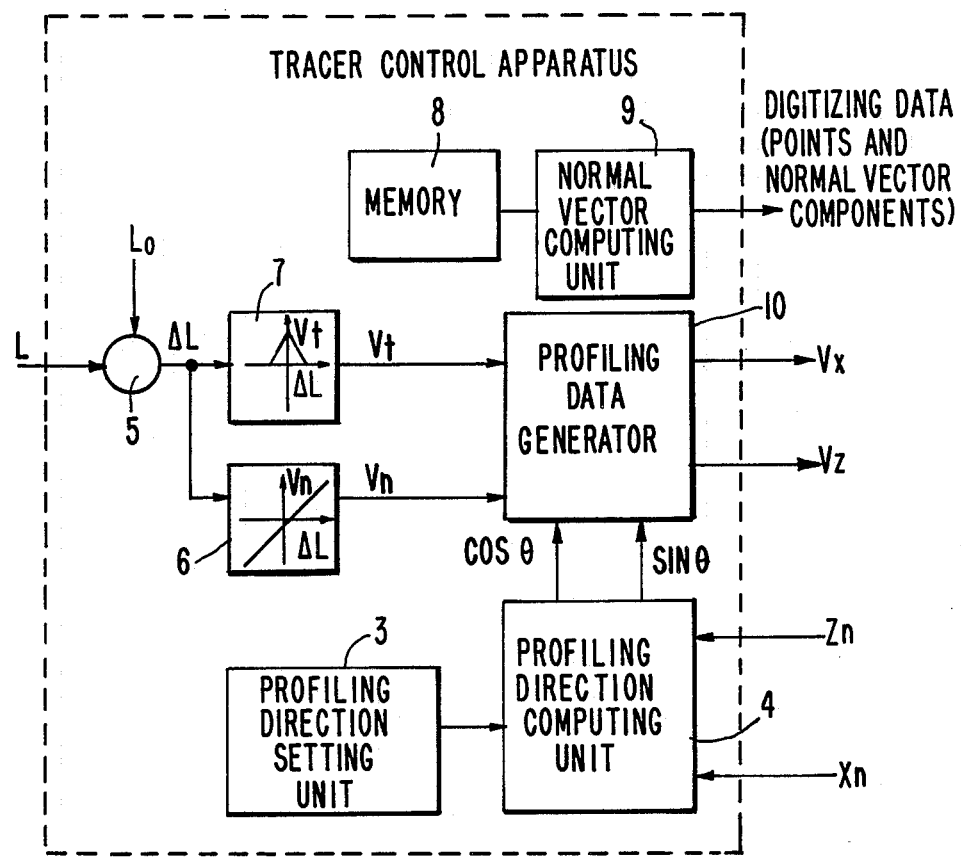
FIG. 1 is a block diagram of an embodiment according to the present invention.

FIG. 1 is a block diagram of the general construction of the abovementioned tracer control apparatus 11. Numeral 3 denotes a profiling direction setting unit for setting profiling directions which define the second profiling path 2, which forms a plurality of points of intersection with the first profiling path 1 at predetermined intervals. Numeral 4 denotes a profiling direction computing unit for computing a profiling direction, 5 an adder for computing the error quantity $_\Delta L$ between the measured distance L and the reference distance $L_o$, 6 a velocity signal generating unit for generating a normal direction velocity signal Vn, 7 a velocity signal generating unit for generating a tangential direction velocity signal, 8 a memory for storing a tangential direction velocity signal Vt, 9 a normal vector computing unit for computing a normal vector at the point of intersection between the two profiling paths, and 10 a profiling data generating unit for generating profiling data from the computed profiling direction and velocity signals.

Contactless profiling with the digitizing apparatus having the construction designed above will now be described.

First, the probe P is moved along the first profiling path 1, the results are digitized and a tangential vector, which is based on the error quantity between measured distance and reference distance of the probe P computed at this time, is stored in the memory 8. Next, the probe P is moved along the path 2 formed by the profiling direction setting unit 3. In this case, the profiling direction setting unit 3, which sets the second profiling direction so as to form a plurality of points of intersection with the first profiling path 1 at a predetermined interval, defines the profiling path 2 in synchronization with the computation period of the profiling direction computing unit 4, thereby forming the plurality of points of intersection. The reason for this is convenience in terms of the computations when performing a profiling data correction, described below.

Figure 5:
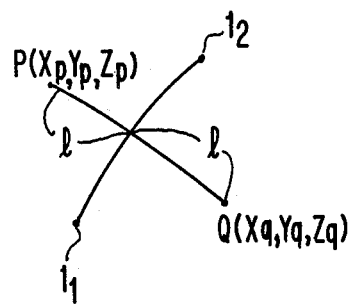
FIGS. 5 and 6 are graphs of a procedure for computing a normal vector at a point of intersection.
Figure 6:
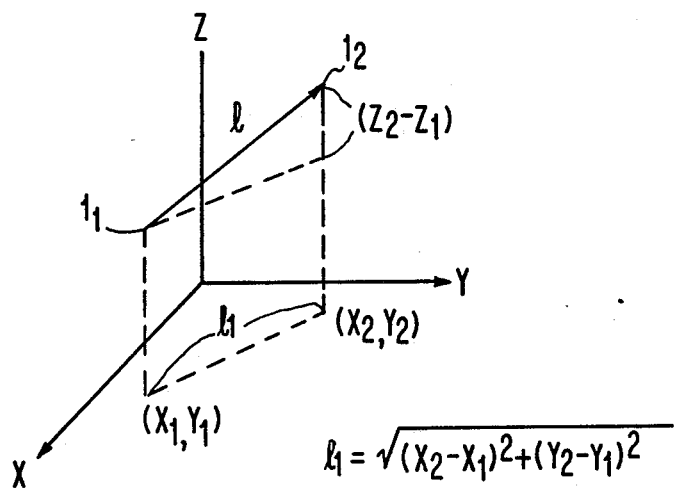

FIG. 5 is a portion of the second path along which the probe P is moved at right angles to the first path 1. Let (Xp,Yp,Zp) and (Xq,Yq,Zq) respectively represent machine positions at points P and Q astride the path 1, and let $l_1$ and $l_2$ respectively represent tangential vector beginning and end points on either side of the point of intersection with the path 1. A perpendicular vector which perpendicularly intersects the tangential vector of the profiling path 1, and a perpendicular vector which perpendicularly intersects a vector PQ obtained by linearly approximating the profiling path 2, are computed as follows:

Based on the length $l_1 = \sqrt{(X2-X1)^2 + (Y2-Y1)^2}$ of the projection of the tangential vector 1 shown in FIG. 6 onto the x-y plane, the former perpendicular vector is a vector perpendicular to this tangential vector 1 ($l_1$,Z2-Z1). That is, this perpendicular vector is expressed as follows in the original x-y-z space:

$$\left( \frac{|X1 - X2|}{l_1} * - |Z1 - Z2|, \frac{|Y1 - Y2|}{l_1} * - |Z1 - Z2|, l_1 \right)$$

Similarly, based on the length $l_2 = \sqrt{(Xp-Xq)^2 + (Yp-Yq)^2}$ of the projection of PQ onto the x-y plane. The vector which perpendicularly intersects the vector $\overrightarrow{PQ}$ is a vector perpendicular to the vector $\overrightarrow{PQ}$ ($l_2$,Zq-Zp). That is, this perpendicular vector is expressed as follows in the original x-y-z space:

$$\left( \frac{|Xp - Xq|}{l_2} * - |Zp - Zq|, \frac{|Yp - Yq|}{l_2} * - |Zp - Zq|, l_2 \right)$$

The normal vector computing unit 9 computes the two perpendicular vectors from the tangential vector stored in the memory 8, adds these two vectors and outputs the sum as digitizing data in the normal direction with regard to the model surface.

It is of course permissible to store a tangential vector at each point of the profiling path 1 in the memory 8 from the beginning based on the data from the computing unit 4. Further, depending upon the setting of the second profiling path 2, the method of computation between the two perpendicular vectors performed by the computing unit 9 can be changed. For example, the normal vector can be computed by a weighted mean which is appropriately weighted. In any case, by thus accurately deciding the normal direction with respect to digitizing data formed along the initial profiling path 1, an accurate three-dimensional correction can be performed when performing machining by the digitizing data.

Though an embodiment of the present invention has been described for a case where the tracer control apparatus 11 is expressed as being composed of the hardware shown in FIG. 1, the invention is not limited thereto but can be modified in a variety of ways without departing from the scope of the claims.

The digitizing apparatus of the present invention is such that the digitizing of a model surface is performed twice using a contactless probe. The direction of the normal to the digitized model can be accurately decided, and digitizing data which includes highly precise three-dimensional correction direction data can be formed.

I claim:

1. A digitizing apparatus in which the surface of a model is traced by a probe which measures distance contactlessly, thereby forming digitizing data along the profiling path, said digitizing apparatus comprising:

profiling direction setting means for setting a first profiling direction for defining the profiling path, and for setting a second profiling direction which perpendicularly intersects the first profiling direction;

memory means, operatively connected to said profiling direction setting means, for storing tangent vectors computed from an error quantity between a probe measurement distance and a reference distance in said first and second profiling directions;

arithmetic means, operatively connected to said memory means, for computing from a perpendicular vector computed on the basis of said tangent vectors, a normal vector with regard to the surface of the model at a point of intersection between said first and second profiling directions; and correcting means, operatively connected to said arithmetic means, for correcting, on the basis of the normal vector, digitizing data formed in accordance with said first profiling direction.

2. A digitizing apparatus according to claim 1, wherein said profiling direction setting means sets said second profiling direction so as to form a plurality of points of intersection with said first profiling path at predetermined intervals.

3. A digitizing apparatus according to claim 1, wherein said memory means stores a tangential vector as a functional value of the error quantity.

4. A digitizing apparatus according to claim 1, wherein said arithmetic means computes a normal vector at a point of intersection by adding two perpendicular vectors.

* * * * *